United States Patent [19]

Betz

[11] 4,279,581

[45] Jul. 21, 1981

[54] HOT ISOSTATIC PRESS

[75] Inventor: Wolfgang Betz, Munich, Fed. Rep. of Germany

[73] Assignee: MTU Motoren-Und Turbinen-Union Munchen GmbH, Munich, Fed. Rep. of Germany

[21] Appl. No.: 170,208

[22] Filed: Jul. 18, 1980

[30] Foreign Application Priority Data

Jul. 21, 1979 [DE] Fed. Rep. of Germany ....... 2929695

[51] Int. Cl.[3] .......................... B29C 3/00; B30B 5/02; B30B 11/00; B22F 3/00

[52] U.S. Cl. .................................. 425/78; 425/405 H

[58] Field of Search ........................ 425/78, 79, 405 H

[56] References Cited

U.S. PATENT DOCUMENTS

| | | | |
|---|---|---|---|
| 3,118,177 | 1/1964 | Von Platen | 425/405 H X |
| 3,241,188 | 3/1966 | Febbo et al. | 425/405 H X |
| 3,613,157 | 10/1971 | Landa et al. | 425/405 H X |
| 3,797,986 | 3/1974 | Onder | 425/405 H X |
| 4,151,400 | 4/1979 | Smith et al. | 425/405 H X |
| 4,217,087 | 8/1980 | Bowles | 425/78 |

*Primary Examiner*—J. Howard Flint, Jr.
*Attorney, Agent, or Firm*—Alan H. Levine

[57] ABSTRACT

A hot isostatic press comprising a working vessel, formed of at least two pieces, having a working chamber within it. The working medium supplied to the working chamber, for transmitting pressure to work pieces within the chamber, may be a molten metal. Heating means within the vessel and cooling means at the exterior of the vessel cooperate to produce a continuous isothermal region completely surrounding the working chamber. The isothermal region is at the solidification temperature of the metal working medium, so that any potential leaks of molten metal working medium from the vessel are sealed by solidification of metal reaching the isothermal region. There is a heat-resistant liner within the vessel, the isothermal region being within the liner. A storage vessel for the working medium and a high pressure vessel, which may be a plunger pump, are connected to each other and to the working vessel through conduits furnished with valves.

10 Claims, 1 Drawing Figure

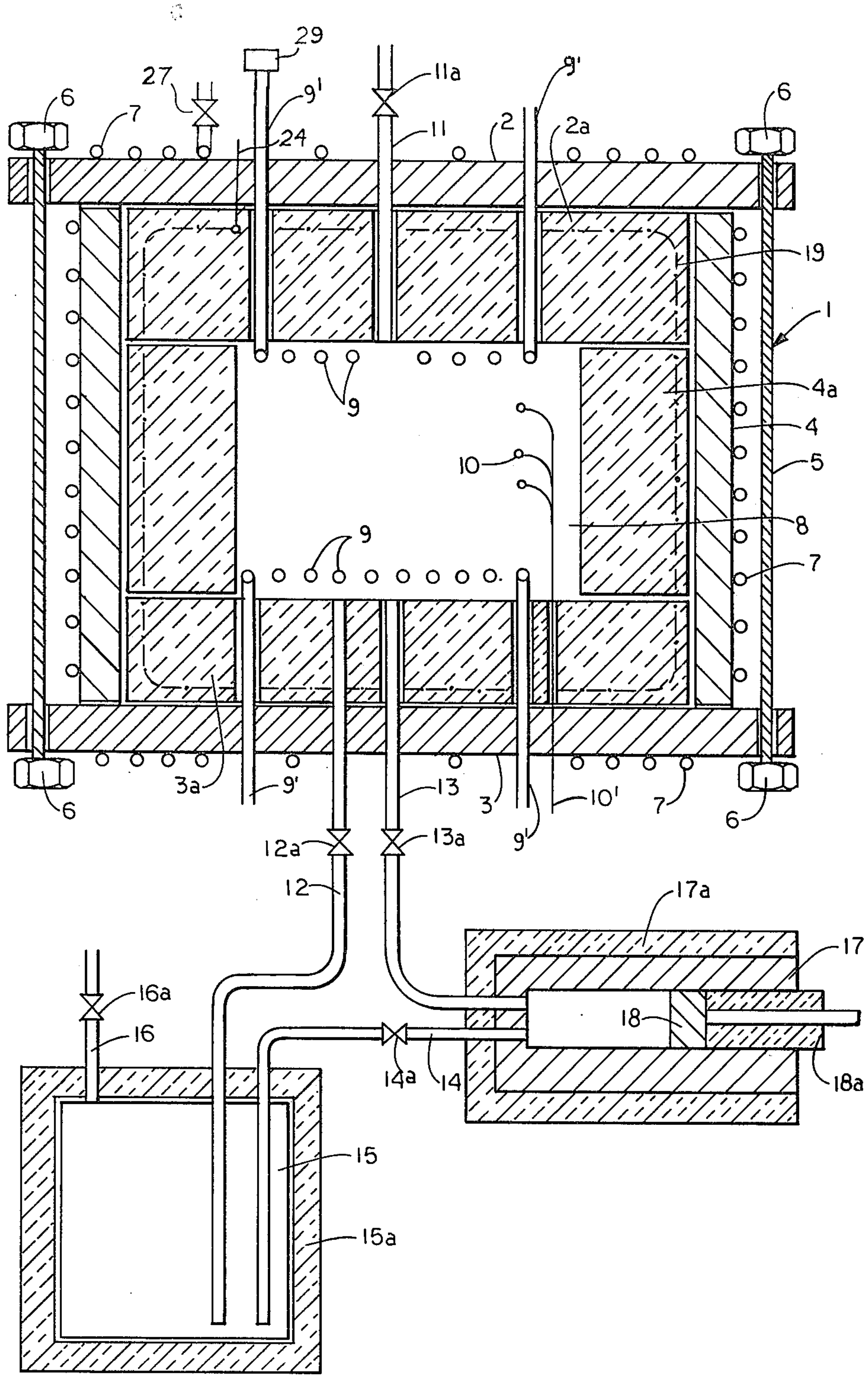
29
27
11a
9'
6
7
24
11
2
2a
19
1
4a
9
4
10
5
8
7
3a
13
3
10'
12a
13a
12
17a
17
16a
16
18
14a
14
18a
15
15a

HOT ISOSTATIC PRESS

This invention relates to a hot isostatic press, especially for use in the manufacture of powder metallurgical components, the manufacture or compacting of ceramic components, and the compacting of castings.

Known hot isostatic presses use gas, e.g. argon, to transmit pressure, and these presses are suitable for use at maximum temperatures of about 1750° C. and at maximum pressures of about 2000 bars. The disadvantage of known presses is that they require complex, and accordingly expensive, provisions for pumping and storing the working gas, especially since additional costs are incurred for various safety components required to meet the extreme risks presented by the equipment.

It is a broad object of the present invention to provide a hot isostatic press capable of low-risk operation at temperatures between 1300° and 1750° C. and pressures up to at least 3000 bars, and having a moderate manufacturing cost.

The invention is described more fully with reference to the accompanying drawing, which illustrates a preferred embodiment.

The working chamber 8 of the press is arranged inside a working vessel 1, preferably of steel. The working vessel includes a tubular jacket 4, a planar bottom 3 and a planar top cover 2, these parts being clamped together by means of tierods 5 and nuts 6. Arranged in the interior of these wall components is a lining comprising metal-encapsulated, thick-walled, and highly heat-resistant layers ***2a*, *3a* and *4a* consisting of sand, mullite, ZrO or MgO in the form of a loose fill. These layers enclose the working chamber 8**.

Arranged on the wall of the working vessel 1 are pipes 7 which carry water for cooling purposes. Passing through the top cover 2 and inner layer ***2a*, as well as through the bottom 3 and inner layer *3a*, are lines 9′, such as electrical lines, connected at the inner layers to heating means 9 for heating the working chamber 8**.

In the embodiment illustrated in the drawing, lines 10′ pass through the bottom 3 and inner layer ***3a*, and are connected to pressure and thermal probes in the working chamber 8. Air supply and exhaust pipe 11, having a valve *11a*, extends through the top cover 2 and inner layer *2a*.**

Passing through the bottom 3 and inner layer *3a* is a pipe 12, with a valve ***12a*, which at its other end extends to nearly the bottom of a storage vessel 15 for the working medium. Vessel 15 is provided with a thermally insulating layer *15a* and is pressurized with compressed air through a pipe 16 having a valve *16a*.**

Also passing through the bottom 3 and inner layer *3a* is a pipe 13, having a valve ***13a*, connected to a high-pressure vessel 17. Vessel 17 has a thermally insulating layer *17a* and incorporates a pump cylinder in which a plunger 18, provided with a thermally insulating layer *18a*, is arranged for sliding movement. A pipe 14, having a valve *14a*, is connected to the high-pressure vessel 17 and its other end extends almost to the bottom of the storage vessel 15**.

The press is operable without the aid of pump 18, provided a sufficient supply of working medium is kept in the high-pressure vessel 17, or in the pressure vessel of the working chamber 8 if it is thermally insulated from it. The press will then be operated as a fully closed static system.

The pipes 12, 13, and 14, carry the working medium. These pipes are provided with a jacket-type heating conductor inside and with cooling means outside to permit operation in the manner described below.

In lines 9′ there are arranged control means 29 (only one of which is shown in the drawing) to control the amount of heat supplied to the working vessel. The supply of cooling water, or other cooling medium, is controlled by a valve 27. Control means 29 and valve 27 are controlled by a temperature sensor 24 arranged in the heat-resistant layer *4a* such that a continuous isothermal region is produced completely surrounding the working chamber, the isothermal region being at the solidification temperature of the working medium.

The working medium used, such as a suitable metal, is in the liquid phase when the maximum operating temperature, e.g., 1750° C., is reached, but solidifies at about 300° C. Thermal insulation and cooling of the vessel 1 keep a continuous isothermal region, illustrated by broken line 19, at the solidification temperature of the molten working medium. Region 19 is within the highly heat-resistant inner layer, and completely surrounds working chamber 8. This serves to seal leaks, should these develop in the press, with solidified working medium. The valves ***11a*, *12a*, *13a*, and *14a*,** wetted by the working medium, are designed to close when the molten working medium cools and solidifies open when it heats up. These valves can additionally be fitted with mechanical closing components.

The hot press of the present invention operates as follows: It can be loaded either from above, or from below by the build-up process.

(a) Loading from above:

The press is fully assembled, except for the top cover and inner layer. The work pieces are inserted from above, or are suspended from the top cover and inner layer and brought into place together with the cover. The cover and inner layer are then positioned in their place, and the press is then clamped together by means of the tierods.

(b) Loading from below:

The work pieces are loaded onto the bottom and inner layer and arranged as required. The remaining parts of the press are then assembled, in the shape of a hood, and placed over the bottom, or the bottom and inner layer are moved into the hood, after which the tierods are installed.

Upon closure of the press the preheated working chamber 8 is flooded with molten working medium. The valve *13a* is closed, and working medium flows from storage vessel 15 through the open valve *12a* as a result of the higher gas pressure in the storage vessel 15 than in chamber 8. The molten working medium is only slightly above solidification temperature. In the process, air escapes from the working chamber 8 through the pipe 11, valve *11a* being open, until the chamber is filled with molten working medium all the way to the exhaust valve ***11a*, at which point the valve closes. Depending upon requirements, the working temperature can be achieved in the presence or absence of inlet pressure, with the valves *11a*, *13a* and *12a*** being closed.

As the temperature rises in the working chamber, so does the pressure, causing the work pieces to be pressed together, or compacted. Depending upon the amount of shrinkage experienced by the work pieces, additional molten working medium is forced into the working chamber through the valve ***13a*, or in the case of excess pressure, is exhausted. The pressure in the working chamber is controlled via the pump plunger 18, with the valve 13***a* open and the valve 12*a* closed. When the supply of molten working medium in the pump cylinder 17 is exhausted, the valve 13*a* is closed and the cylinder is refilled through the line 14 and the open valve 14*a*.

When the pressure in the working chamber 8 remains constant with no further molten working medium being supplied, the compaction process has come to an end. The heating devices are then turned off and the molten medium is allowed to escape, through the line 14 and the open valve 14*a*, into the storage vessel 15, after which the press can be opened and unloaded.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A hot isostatic press comprising:

(a) a working vessel defining a working chamber within it, (b) means for supplying a molten metal working medium to the working chamber, (c) heating means within the vessel and cooling means at the exterior of the vessel, and (d) control means interconnecting the heating and cooling means and producing a continuous isothermal region completely surrounding the working chamber, the isothermal region being at the solidification temperature of the metal working medium, whereby any potential leaks of molten metal working medium from the vessel are sealed by solidification of molten metal reaching the isothermal region.

2. A hot isostatic press as defined in claim 1 wherein the working vessel comprises at least two pieces.

3. A hot isostatic press as defined in claim 1 including a heat-resistant liner within the vessel.

4. A hot isostatic press as defined in claim 1 including a storage vessel for the working medium, a high pressure vessel, conduits connecting the working vessel to the storage vessel and to the high pressure vessel, a conduit connecting the storage vessel to the high pressure vessel, and a valve in each of the conduits.

5. A hot isostatic press as defined in claim 1 wherein the working vessel comprises a tubular jacket and flat covers, tie rods for clamping the jacket and covers together, and a lining within the vessel comprising a metal-encapsulated, thick-walled and highly heat-resistant layer filled with one or more products selected from sand, mullite, ZrO, and MgO.

6. A hot isostatic press as defined in claim 5 including lines for activating the heating means passing through the covers and lining.

7. A hot isostatic press as defined in claim 5 including an air supply and exhaust pipe passing through one of the covers and the lining, the pipe communicating with the working chamber.

8. A hot isostatic press as defined in claim 4 wherein the high pressure vessel is a plunger pump.

9. A hot isostatic press as defined in claim 4 wherein the valves open when contacted by the molten working medium and close when contacted by solidified working medium.

10. A hot isostatic press as defined in claim 9 wherein the valves can also be opened and closed mechanically.

* * * * *